(12) United States Patent
Ozolins et al.

(10) Patent No.: US 10,445,483 B2
(45) Date of Patent: *Oct. 15, 2019

(54) COMPUTER KEYBOARD WITH SECURE AUTHENTICATION FEATURES

(71) Applicant: Bloomberg Finance L.P., New York, NY (US)

(72) Inventors: Helmars E. Ozolins, Orient, NY (US); Masamichi Udagawa, New York, NY (US); Sean Roarty, Ossining, NY (US); Avram Kaufman, New York, NY (US); Christopher William Zimman, New York, NY (US); Stanislaw Skowronek, New York, NY (US); Emmanuel Patychakis, Lidingö (SE)

(73) Assignee: BLOOMBERG FINANCE L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,488

(22) Filed: Apr. 9, 2018

(65) Prior Publication Data

US 2018/0225440 A1  Aug. 9, 2018

Related U.S. Application Data

(63) Continuation of application No. 14/146,264, filed on Jan. 2, 2014, now Pat. No. 9,971,886, which is a continuation-in-part of application No. 29/468,239, filed on Sep. 27, 2013, now Pat. No. Des. 724,589.

(51) Int. Cl.
*H04L 29/06* (2006.01)
*G06F 21/32* (2013.01)
*G06F 21/83* (2013.01)
*G06F 8/65* (2018.01)

(52) U.S. Cl.
CPC .............. *G06F 21/32* (2013.01); *G06F 21/83* (2013.01); *G06F 8/65* (2013.01)

(58) Field of Classification Search
CPC .................................................... G06F 1/1632
See application file for complete search history.

(56) References Cited

U.S. PATENT DOCUMENTS

| | | |
|---|---|---|
| 5,717,430 A | 2/1998 | Copland et al. |
| 6,215,420 B1 | 4/2001 | Harrison et al. |
| D492,308 S | 6/2004 | Ozolins et al. |
| D516,070 S | 2/2006 | Ozolins et al. |

(Continued)

FOREIGN PATENT DOCUMENTS

TW    D1114159    12/2006

OTHER PUBLICATIONS

Search Report issued in corresponding Taiwanese Application No. 103301758 dated Sep. 22, 2014.

*Primary Examiner* — Edward Zee
*Assistant Examiner* — Leynna T Truvan
(74) *Attorney, Agent, or Firm* — Chiesa Shahinian & Giantomasi PC

(57) ABSTRACT

A keyboard is disclosed. The keyboard may comprise a biometric sensor configured for authenticating a user; a docking station configured for receiving a security device; and a processor configured for facilitating communication between the biometric sensor and the security device docked in the docking station with a computing device coupled to the keyboard.

17 Claims, 6 Drawing Sheets

(56) References Cited

U.S. PATENT DOCUMENTS

| | | |
|---|---|---|
| 7,046,234 B2 | 5/2006 | Ozolins |
| 7,364,473 B2 | 4/2008 | Ohta |
| D579,450 S | 10/2008 | Ozolins et al. |
| D599,349 S | 9/2009 | Meyer et al. |
| D604,736 S | 11/2009 | Andre et al. |
| D626,555 S | 11/2010 | Huang |
| 8,232,967 B2 | 7/2012 | Ozolins |
| 2004/0066611 A1 | 4/2004 | Wu |
| 2006/0005023 A1* | 1/2006 | Homer .................... G06F 21/32 713/168 |
| 2006/0066438 A1 | 3/2006 | Altounian et al. |
| 2012/0066608 A1* | 3/2012 | Sundermeyer ....... G08B 25/003 715/738 |

* cited by examiner

COMPUTER KEYBOARD WITH SECURE AUTHENTICATION FEATURES

CROSS REFERENCE TO RELATED APPLICATION

This application is a Continuation of U.S. patent application Ser. No. 14/146,264, filed Jan. 2, 2014, which is a Continuation-in-Part of U.S. patent application Ser. No. 29/468,239, filed Sep. 27, 2013, now U.S. Pat. No. D724,589, the disclosures of which are incorporated herein by reference in their entirety.

BACKGROUND

As information usage becomes more prevalent and valuable, individuals and businesses alike will seek additional ways to process and store information. With the processing and storing of information, comes the need to properly secure the information and ensure that it is only accessible to authorized users. As keyboards are widely utilized in connection with information usage, users are increasingly looking to the keyboard as a solution to issues relating to access of the information.

SUMMARY

Embodiments of the present disclosure are directed to a keyboard. The keyboard may comprise a biometric sensor configured for authenticating a user; a docking station configured for receiving a security device; and a processor configured for facilitating communication between the biometric sensor and the security device docked in the docking station with a computing device coupled to the keyboard.

In an embodiment, the biometric sensor is further configured for scanning an image to authenticate the user.

In an embodiment, the biometric sensor may comprise a fingerprint sampling device.

In an embodiment, the biometric sensor is further configured for authenticating a user to allow access by the user to the computing device.

In an embodiment, the biometric sensor is further configured for authenticating a user to allow access by the user to a software program executing on the computing device.

In an embodiment, the docking station is further configured for establishing a communication link between the security device and the computing device.

In an embodiment, the security device is associated with a user and when docked in the docking station, the security device communicates with the computing device to authenticate the user.

In an embodiment, the security device is a biometric security device comprising a power button, display screen, and biometric sensing device.

In an embodiment, the docking station is further configured for charging or recharging the security device.

In an embodiment, the docking station is further configured for transmitting an update from the computing device to the security device.

In an embodiment, docking of the security device with the docking station causes automatic authentication of a user of the computing device.

In an embodiment, the processor is further configured for transmitting authentication signals from the biometric sensor to the computing device, allowing access to a user of the computing device.

In an embodiment, the processor is further configured for detecting a charge level of the security device docked in the docking station, and determining whether to charge the security device based on the detected charge level In an embodiment, the processor is further configured for detecting a current software version of the security device docked in the docking station, and determining whether to apply an update to the security device based on the detection. The processor may further be configured to apply an update to the security device by receiving the update from the computing device, and installing the update to the security device.

In an embodiment, the keyboard may further comprise a connector configured for connecting a communication cable between the keyboard and the computing device, wherein the connector is releasable from the keyboard.

In another embodiment of the present disclosure, a method for communicating between a keyboard and a docked security device is disclosed. A processor detects a docking of a security device with a docking station of a keyboard. Characteristics of the docked security device are identified. The transmission of a signal to the docked security device from the keyboard is determined based on the identified characteristics of the docked security device.

In an embodiment, identifying characteristics of the docked security device may comprise identifying a current power level of the docked security device. Determining the transmission of a signal may comprise determining that the docked security device requires charging based on the current power level, and transmitting a signal to the docking station to charge the docked security device.

In an embodiment, identifying characteristics of the docked security device may comprise determining a current version of firmware installed on the docked security device. Determining the transmission of a signal may comprise determining an updated version of the firmware, and transmitting the updated version of the firmware to the docked security device to be updated.

The aforementioned embodiments and other advantages of the embodiments described herein will be apparent to those of ordinary skill in the art at least by reference to this summary, the following detailed description, and the accompanying drawings.

BRIEF DESCRIPTION OF THE DRAWINGS

The systems and methods described herein may be better understood with reference to the following drawings and detailed description. Non-limiting and non-exhaustive embodiments are described with reference to the following drawings.

DETAILED DESCRIPTION

Detailed embodiments of the present disclosure are provided herein. Any and all disclosed embodiments are merely exemplary and may be embodied in various and alternative forms, and combinations thereof. As used herein, "exemplary," and similar terms, may refer expansively to embodiments that serve as an illustration, specimen, model, or pattern. The figures may include exaggerated or minimized features, in order to adequately show details of particular components. In certain instances, well-known components, systems, materials or methods that have not been described in detail in order to avoid obscuring from the focus of the present disclosure. Therefore, specific structural and functional details disclosed herein are in no way to be interpreted as limiting, but merely as a basis for the claims and as a representative basis recognizable to one skilled in the art to employ the present disclosure.

While the detailed description may include a general context of computer-executable instructions, the present disclosure may be implemented in combination with other program modules and/or as a combination of hardware and software. Thus, terms such as "computer" or "computing device" as used herein are expansive and are meant to include routines, program modules, programs, components, data structures, algorithms, and the like. Various systems may also be used for the implementation of the embodiments described herein, including single processor or multi-processor systems, minicomputers, mainframe computers, personal computers, hand-held computing devices, microprocessor-based computers, programmable consumer electronics, in-vehicle computing devices, and any of the aforementioned combinations thereof, and the like.

In various embodiments, the present disclosure describes a keyboard which includes a biometric sensor for authenticating a user and a docking station configured for receiving a security device. A processor of the keyboard communicates with the biometric sensor and security device to facilitate user authentication with a computing device.

Figure 1:
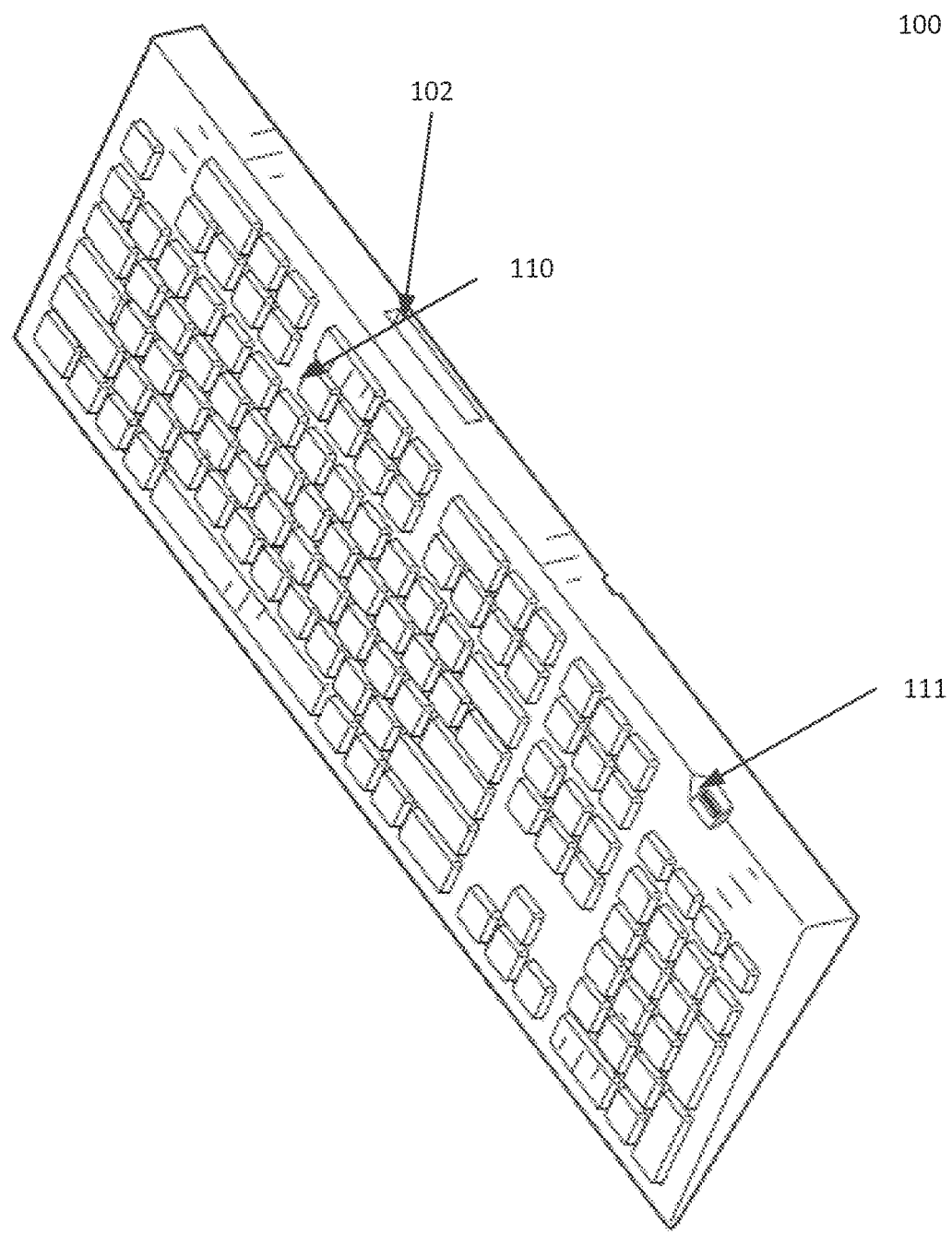
FIG. 1 illustrates a perspective view of an embodiment of a keyboard in accordance with the present disclosure.

FIG. 1 illustrates a perspective view of an embodiment of a keyboard in accordance with the present disclosure. Keyboard 100 comprises, inter alia, an array of keys 110, a biometric sensor 111, and a docking station 102. Keyboard 100 may communicate with other devices such as a computing device coupled to the keyboard by a cable (not shown) or via wireless means. Biometric sensor 111 is configured for authenticating a user to provide access to keyboard 100 and/or a computing device that keyboard 100 is communicating with or coupled to. Biometric sensor 111 may be configured for scanning an image, such as a fingerprint to authenticate a user. Biometric sensor 111 may thus include or be a fingerprint sampling device. Additionally, rather than simply providing access to the keyboard 100 or computing device, biometric sensor 111 may be configured to authenticate a user to allow access by the user to a software program executing on the computing device.

Docking station 102 is configured for establishing a communication link between the security device and the computing device. Docking station 102 is configured for interacting with and communication with a security device such as that shown in FIG. 2. Docking station 102 facilitates charging or recharging of a battery of the security device when the security device is docked with docking station 102. Docking station 102 also facilitates transmission of updates from the computing device to the security device. The updates may be, for example, firmware updates or software updates to the security device. As mentioned, when the security device is docked with docking station 102, authentication of a user may occur. Authentication may be automatic upon insertion or docking of the security device with docking station 102.

Keyboard 100 also contains a processor (not shown) facilitating communication between the biometric sensor and the security device docked in the docking station with a computing device coupled to or in communication with keyboard 100. The processor may, for example, be configured for detecting a charge level of the security device docked in the docking station, and making a determination regarding whether the security device should be charged based on the detected charge level. The processor may also be responsible for transmitting authentication signals from the biometric sensor 111, as a result of receiving biometric information, to a computing device, to allow a user access to the computing device.

The processor may also detect a current software version of the security device docked in docking station 102, and perform a determination of whether to apply an update to the security device. The processor may apply the update by receiving an applicable update from the computing device and causing installation of the update to the security device.

Keyboard 100 may further be configured for connecting a communication cable between the keyboard and the computing device, wherein a connector of the communication is releasable from the keyboard side. Typically, connectors are releasable from the computing device side. A removeable panel may also be placed on a bottom side of keyboard 100 to house and hide the connector releasable from the keyboard side.

Figure 2:
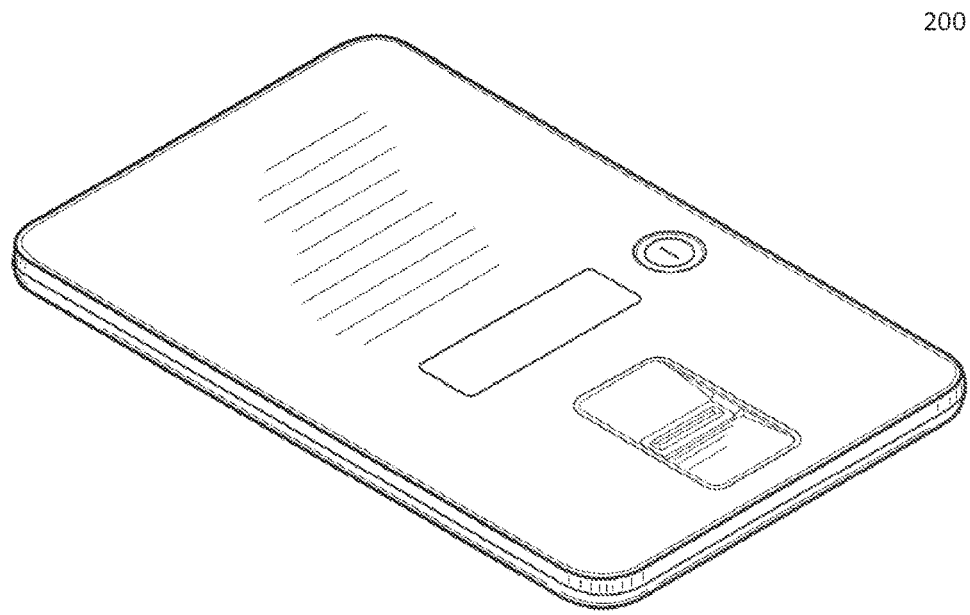
FIG. 2 illustrates a perspective view of a security device in accordance with the embodiments described herein.

FIG. 2 illustrates a perspective view of an exemplary security device in accordance with the embodiments described herein. Security device 200 is exemplary and is representative of a security device that may facilitate user access to a keyboard, terminal, display, or any other comparable computing device. Security device 200 may have the features of a device, system or method as described by U.S. Pat. No. 8,203,423, incorporated by reference, herein. Security device 200 is configured such that it may dock with docking station 102.

Figure 3:
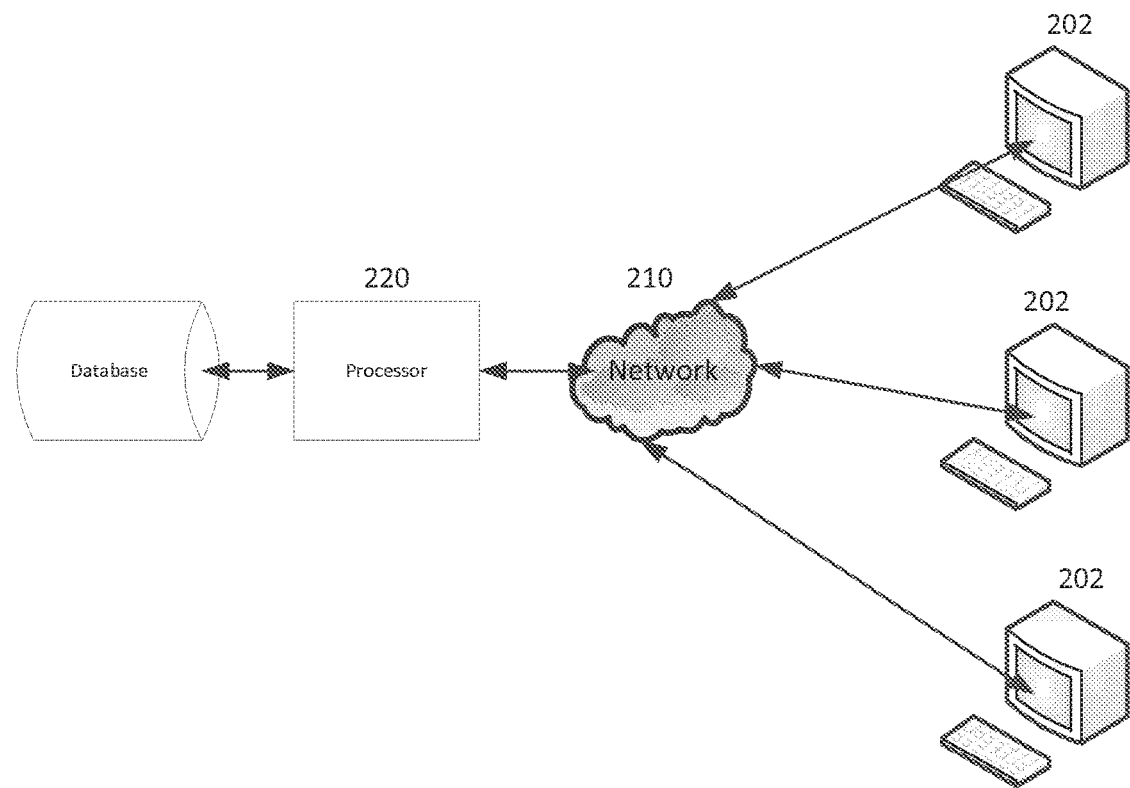
FIG. 3 illustrates a view of a computer system comprising a plurality of keyboards in accordance with the embodiment described herein.

Keyboard 100 is suitable for coupling to and communication to a computing device or other device to facilitate use in controlling and operating a wide variety of devices, including, for example, general purpose computing devices or data processing machines or devices. FIG. 3 illustrates a view of a computer system comprising a plurality of keyboards in accordance with the embodiment described herein. For example, FIG. 3 shows a plurality of keyboards 100 coupled to a variety of computers or computing devices, which could be stand-alone personal computer systems, workstations of a local area network, a local area network server, or server/host system and processor 220, which may be linked by network 210.

Keyboard 100 may provide input to computers or computing devices 202 coupled to a corresponding keyboard 100. Input may be accomplished via operation of keys 101. Keys 101 may be pressed in various sequences and combinations to facilitate transmittal of commands, data, and other information to any computing device coupled to the keyboard. The information may be processed by the computing device or other networked computing devices 202 linked through network 210.

Keyboards may provide an array of alphanumeric keys with or without additional numeric, mathematical calculation, and symbol and functional keys, special purpose keys or key groupings provided for controlling computing devices in special functions, and any other keys consistent with the embodiments described herein. Keyboard 100 may include certain keys used to control e-mail and other computer communications. Additional keys may be used to control speaker volume, and other audio or telephony functions. Keyboard 100 may also include an infrared or other type of sensor for facilitating communication between keyboard 100 and other devices capable of communicating wirelessly with keyboard 100.

Figure 4:
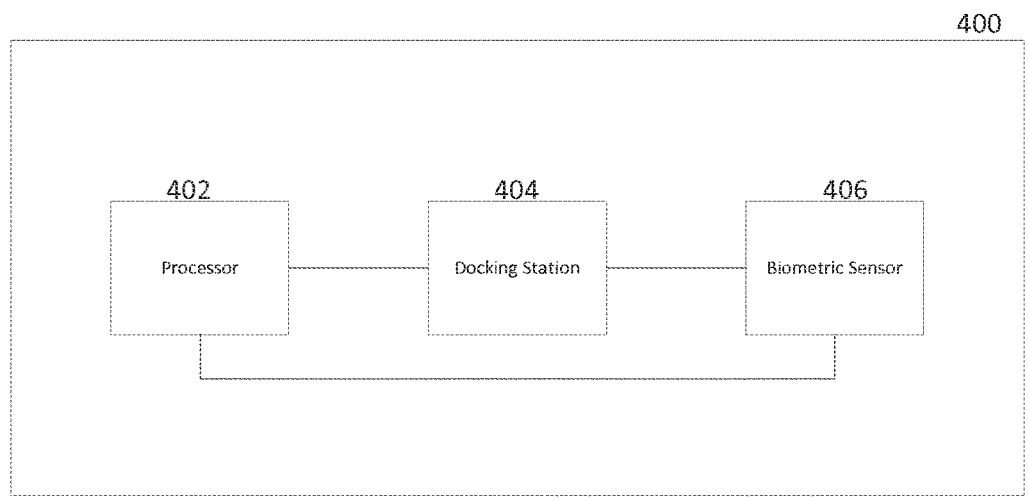
FIG. 4 illustrates an exemplary block diagram of a keyboard in accordance with the embodiments described herein.

FIG. 4 illustrates an exemplary block diagram of certain internal components of a keyboard in accordance with the embodiments described herein. Keyboard 400, as shown, includes at least a processor 402, docking station 404, and biometric sensor 406. Biometric sensor 406 is configured for authenticating users. Docking station 404 is configured for receiving a security device such as that shown in FIG. 2. Processor 402 is configured for facilitating communication between the biometric sensor 406 and the security device docked in docking station 404 with a computing device that is coupled to or in communication with the keyboard.

Biometric sensor 406 may be at least partially constructed to include electrically conductive material to facilitate scanning of an image, such as a portion of a user's body in order to authenticate the user. For example, biometric sensor 406 may be a fingerprint sampling device to allow a user to place a digit on biometric sensor 406, and authenticate the user with a fingerprint image. Successful authentication allows a user of keyboard 400 to use a computing device coupled to or in communication with keyboard 400. Authentication may not only allow access by a user to a computing device, but may also be configured to allow access by a user to any associated software programs executing on the computing device. For example, a software program may be executing and available for use on the computing device, but access to certain features will not be granted until a user has been authenticated using biometric sensor 406 of keyboard 400.

Docking station 404 establishes a communication link between a security device as shown by FIG. 2 and a computing device. Docking of a security device at docking station 404 may be detected by the computing device in communication with keyboard 400. As the security device may serve as an alternate means of authenticating the user, docking of the security device with docking station 404 may also initiate an authentication procedure for authenticating the user of keyboard 400 with associated computing device. Thus, when a particular security device has been associated with a user for authentication purposes, and the security device is docked with docking station 404, the security device may communicate with the computing device in order to facilitate authentication of the user.

The security device, as shown by FIG. 2, may include a power button, display screen, and biometric sensing device. Security device 200, as shown, is typically utilized by a user seeking access to a computing device or software executing on the computing device. Security device 200 may be portable. Security device 200 may further comprise a signal sensor (not shown) for receiving a signal from a computing device (such as from a display of the computing device). Biometric sensing device 111 may comprise a biometric sensor for acquiring information representing a biometric characteristic of a user seeking access to the computing device, thus uniquely identifying the user and user's co-location with security device 200. Security device 200 is described by U.S. Pat. No. 8,203,423, incorporated by reference herein.

Docking station 404, configured for receiving a security device such as security device 200, may further be configured to charge or recharge a power supply of the security device. Docking station 404 may further be configured to transmit updates such as firmware updates or software updates affecting the operation of the security device to the security device. Docking station 404 may thereafter send a command to the security device to commence installation of the updates. Upon docking of a security device with docking station 404, docking station 404 may also cause automatic authentication of a user of the computing device based on their association with the particular security device.

Processor 402 facilitates communication between biometric sensor 406 and/or docking station 404 with a computing device. Processor 402 handles transmission of authentication signals from biometric sensor 406 to the computing device, thereby providing access to the computing device. Processor 402 may additionally interface with docking station 404 to facilitate charging of a security device docked with docking station 404, as well as applying software updates to the security device via docking station 404.

While facilitating charging, processor 402 is also able to determine a specific charge level of the security device and based on an analysis of the charge level, determine whether to charge the security device based on the detected charge level. Processor 402 is further configured to detect a current software version of the security device docked in docking station 404, and determining whether to apply an update to the security device based on the detection of the current software version. The update may be received from the computing device attached to or in communication with the keyboard 400.

Keyboard 400 may additionally include further components (not shown) that assist in the operation of the keyboard, or any of processor 402, docking station 404, and biometric sensor 406. The further components may include a connector configured for connecting a communication cable between keyboard 400 and a computing device. The connector may be releasable from the connector's connection point at keyboard 400 as opposed to the computing device. Keyboard 400 may furthermore include a removeable panel configured to house and hide the connector releasable from the connector's connection point at keyboard 400.

Figure 5:
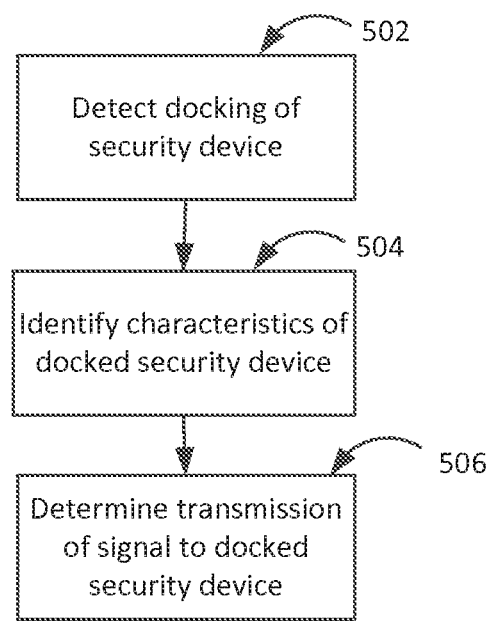
FIG. 5 illustrates an exemplary flow diagram showing an algorithm in accordance with the embodiments described herein.

FIG. 5 illustrates an exemplary flow diagram showing an algorithm in accordance with the embodiments described herein. Method 500, as shown, illustrates an algorithm for communication between a keyboard and a docked security device. In an embodiment, at step 502, a processor 402 of a keyboard, such as keyboard 400, may detect a docking of a security device with a docking station 404 of keyboard 400.

At step 504, characteristics of the docked security device may be identified. Identification of the characteristics may include identifying a current power level of the docked security device or determining a current version of firmware or software installed on the docked security device.

At step 506, a determination of the transmission of a signal to the docked security device from the keyboard 400 based on the identified characteristics of the docked security device takes place. The determination may include a determination that the docked security device requires charging based on the current power level. Determination of the transmission of a signal may also include determining there is an updated version of the firmware, and transmitting the updated version of the firmware to the docked security device to be updated.

All systems and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

All systems and methods described herein may also be implemented using computers operating in a client-server relationship. Typically, in such a system, the client computer is located remotely from the server computer and interaction takes place via a network. The client-server relationship may be defined and controlled by computer programs executing on their respective client and server computers.

All systems and method described herein may also be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, carry out an algorithm, to display specified data on a screen, etc. For example, the server may perform either at the server or cause a client to perform one or more of the method steps described herein, including at least the steps of FIG. 5. Certain steps of the method described herein may be performed by a server or by another processor in a network-based cloud-computing system. Certain steps of the methods described herein may be performed by a client computer in a network-based cloud computing system. The steps of the methods described herein may be performed by a server and/or by a client computer in a network-based cloud computing system, in any combination thereof.

All systems and methods described herein may be implemented using a computer program product tangibly embodied in an information carrier, e.g., in a non-transitory machine-readable storage, for execution by a programmable processor; and the method steps described herein may be implemented using one or more computer programs executable by such processor. A computer program may be a set of computer program instructions that can be used, directly or indirectly, by a computer to perform a certain activity or bring about a certain result. A computer program may be written in any form of programming language, including compiled or interpreted languages, and may be deployed in any form, including as a stand-alone program or as a module, component, subroutine, or other unit suitable for use in a computing environment.

Figure 6:
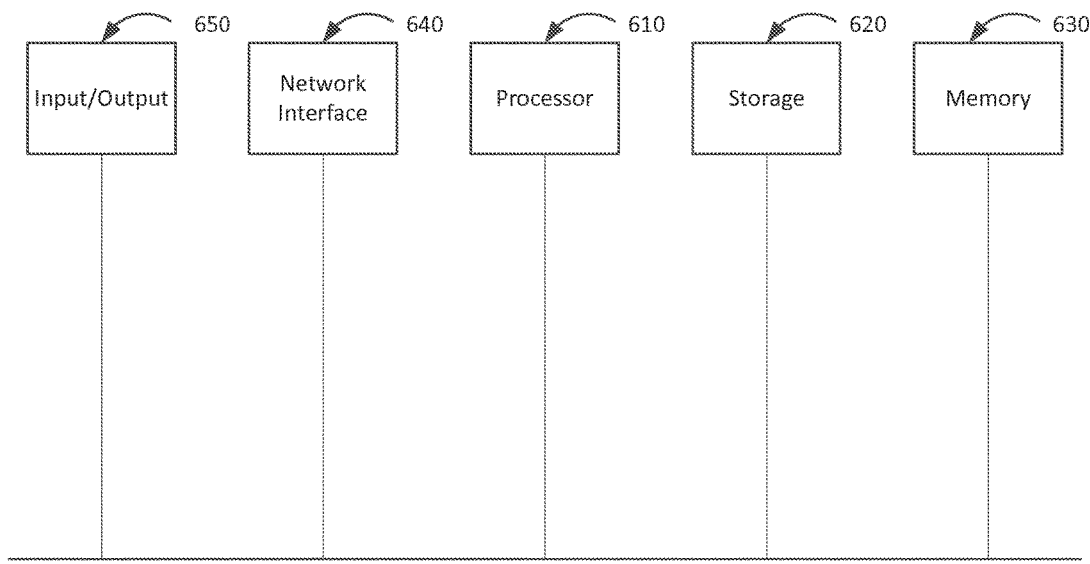
FIG. 6 illustrates a high-level diagram of a computing device that may be used to implement various aspects of the present disclosure.

FIG. 6 illustrates a high-level diagram of a computing device that may be used to implement various aspects of the present disclosure. Computing device 600 comprises a processor 610 operatively coupled to a data storage device 620 and a memory 630. Processor 610 controls the overall operation of computing device 600 by executing computer program instructions that define such operations. The computer program instructions may be stored in data storage device 620, or other computer readable mediums, and loaded into memory 630 when execution of the computer program instructions is desired. Thus, at least the method steps of FIG. 5 can be defined by the computer program instructions stored in memory 630 and/or data storage 620 and controlled by processor 610 executing the computer program instructions. For example, the computer program instructions can be implemented as computer executable code programmed by one skilled in the art to perform at least the algorithms defined by the method steps of FIG. 5. Computing device 600 also includes one or more network interfaces for communicating with other devices via a network. Computing device 600 also includes one or more input/output devices 650 that enable user interaction with computing device 600 (e.g., display, keyboard, mouse, speakers, buttons, etc.).

Processor 610 may include both general and special purpose microprocessors, and may be the sole processor or one of multiple processors of computing device 600. Processor 610 may comprise one or more central processing units (CPUs), for example. Processor 610, data storage device 620, and/or memory 630 may include, be supplemented by, or incorporated in, one or more application-specific integrated circuits (ASICs) and/or one or more field programmable gate arrays (FPGAs).

Data storage 620 and memory 630 each comprise a tangible non-transitory computer readable storage medium. Data storage 620, and memory 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 650 may include peripherals, such as a printer, scanner, display screen, etc. For example, input/output devices 650 may include a display device such as a cathode ray tube (CRT) or liquid crystal display (LCD) monitor for displaying information to the user, a keyboard, and a pointing device such as a mouse or a trackball by which the user can provide input to computing device 600.

Any or all of the systems described herein may be implemented using computing device 600 or any equivalent device.

One skilled in the art will readily recognize that any implementation of an actual computer, computer system, or computing device may have other structures and may contain other components, and that computing device 600 is merely a high level representation of some of the components for illustrative purposes.

The foregoing detailed description of the present disclosure is to be understood as being in every respect illustrative and exemplary, but not restrictive, and the scope of the present disclosure provided herein is not to be determined solely from the detailed description, but rather from the claims as interpreted according to the full breadth and scope permitted by patent laws. It is to be understood that the embodiments shown and described herein are merely illustrative of the principles addressed by the present disclosure and that various modifications may be implemented by those skilled in the art without departing from the scope and spirit of the present disclosure. Those skilled in the art may implement various other feature combinations without departing from the scope and spirit of the present disclosure. The various functional modules shown are for illustrative purposes only, and may be combined, rearranged and/or otherwise modified.

The invention claimed is:

1. A system comprising:
   a computing device; and
   a keyboard communicatively coupled to, but separate from, the computing device, the keyboard comprising:
      a docking station configured to receive a security device for authenticating a user on the computing device, the security device transmitting a code for accessing software executing on the computing device in response to the security device being docked in the docking station; and
      a processor configured to:
         facilitate communication between the security device docked in the docking station and the computing device,
         detect a charge level associated with the security device docked in the docking station, and
         determine whether to charge the security device based on the detected charge level.

2. The system of claim 1, further comprising:
   the security device docked in the docking station.

3. The system of claim 1, the keyboard further comprising:
   a biometric sensor configured to receive biometric information of the user to authenticate the user on the computing device.

4. The system of claim 3, wherein the biometric information comprises a fingerprint of the user.

5. The system of claim 1, wherein the processor is further configured to:
   detect a current software version associated with the security device docked in the docking station; and
   determine whether to apply an update to the security device based on the detected current software version.

6. The system of claim 5, wherein the processor is further configured to:
   in response to determining to apply the update to the security device:
      receive the update from the computing device; and
      cause an installation of the update on the security device.

7. The system of claim 1, the keyboard further comprising:
   a connector configured to connect a communication cable between the keyboard and the computing device, the connector being releasable from the keyboard.

8. A keyboard comprising:
   a docking station configured to receive a security device for authenticating a user on a computing device, the computing device being communicatively coupled to, but separate from, the keyboard, the security device transmitting a code for accessing software executing on the computing device in response to the security device being docked in the docking station; and
   a processor configured to:
      facilitate communication between the security device docked in the docking station and the computing device,
      detect a charge level associated with the security device docked in the docking station, and
      determine whether to charge the security device based on the detected charge level.

9. The keyboard of claim 8, the keyboard further comprising:
   a biometric sensor configured to receive biometric information of the user to authenticate the user on the computing device.

10. The keyboard of claim 9, wherein the biometric information comprises a fingerprint of the user.

11. The keyboard of claim 8, wherein the processor is further configured to:
    detect a current software version associated with the security device docked in the docking station; and
    determine whether to apply an update to the security device based on the detected current software version.

12. The keyboard of claim 11, wherein the processor is further configured to:
    in response to determining to apply the update to the security device:
       receive the update from the computing device; and
       cause an installation of the update on the security device.

13. A method comprising:
    detecting a security device docked in a docking station of a keyboard;
    in response to detecting the security device docked in the docking station, facilitating a transmission of a code from the security device to a computing device that is separate from the keyboard, wherein the code is for authenticating a user for accessing software executing on the computing device;
    detecting a charge level associated with the security device docked in the docking station; and
    determining whether to charge the security device based on the detected charge level.

14. The method of claim 13, further comprising:
    facilitating a transmission of an authentication signal from a biometric sensor to the computing device in response to the biometric sensor authenticating biometric information of the user.

15. The method of claim 14, wherein the biometric information comprises a fingerprint of the user.

16. The method of claim 13, further comprising:
    detecting a current software version associated with the security device docked in the docking station; and
    determining whether to apply an update to the security device based on the detected current software version.

17. The method of claim 16, further comprising:
    in response to determining to apply the update to the security device:
       receiving the update from the computing device; and
       causing an installation of the update on the security device.

* * * * *